(12) United States Patent
Ozaki et al.

(10) Patent No.: US 10,196,987 B2
(45) Date of Patent: Feb. 5, 2019

(54) SHAFT SEALING MECHANISM (71) Applicant: MITSUBISHI HITACHI POWER SYSTEMS, LTD., Kanagawa (JP)

(72) Inventors: Kohei Ozaki, Tokyo (JP); Hidekazu Uehara, Tokyo (JP); Azumi Yoshida, Tokyo (JP); Hiroharu Oyama, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/536,352

(22) PCT Filed: Dec. 15, 2015

(86) PCT No.: PCT/JP2015/085001
§ 371 (c)(1),
(2) Date: Jun. 15, 2017

(87) PCT Pub. No.: WO2016/098753
PCT Pub. Date: Jun. 23, 2016

(65) Prior Publication Data
US 2017/0342909 A1    Nov. 30, 2017

(30) Foreign Application Priority Data
Dec. 16, 2014  (JP) ................ 2014-253685

(51) Int. Cl.
*F16J 15/32* (2016.01)
*F02C 7/28* (2006.01)
(Continued)

(52) U.S. Cl.
CPC .............. *F02C 7/28* (2013.01); *F01D 11/001* (2013.01); *F04D 29/10* (2013.01); *F16J 15/22* (2013.01);
(Continued)

(58) Field of Classification Search
CPC .......... F02C 7/28; F04D 29/10; F01D 11/003; F05D 2240/55; F16J 15/22; F16J 15/24;
(Continued)

(56) References Cited

U.S. PATENT DOCUMENTS 9,677,410 B2    6/2017  Shinohara et al.
2002/0105146 A1 *  8/2002  Uehara ................ F16J 15/3292
277/355
(Continued)

FOREIGN PATENT DOCUMENTS

KR    10-2014-0052916    5/2017
WO    2013/105606    7/2013

OTHER PUBLICATIONS

Extended European Search Report dated Nov. 24, 2017 in corresponding European patent application No. 15869958.7.
(Continued)

*Primary Examiner* — Gilbert Y Lee
(74) *Attorney, Agent, or Firm* — Wenderoth, Lind & Ponack, L.L.P.

(57) ABSTRACT

A shaft sealing mechanism (11) that partitions an annular space (14) that is formed between a fixed part (12) and a rotating shaft (13) into a high-pressure-side region and a low-pressure-side region, that obstructs the flow of a fluid (G), and that is provided with: a plurality of annularly laminated thin-plate seal pieces (22) that are fixed to an annular seal housing (21) that is provided to the fixed part and are in sliding contact with the rotating shaft; and an annular low-pressure-side plate (26) that is sandwiched and held such that a low-pressure-side gap (δL) is formed between the seal housing and a low-pressure-side side edge part (22d) of the thin-plate seal pieces. The thin-plate seal pieces have pressure-conduction holes (31) that are formed further to the inside in the radial direction of the rotating
(Continued)

shaft than an inner-circumferential-side tip part (26a) of the low-pressure-side plate.

4 Claims, 6 Drawing Sheets

(51) Int. Cl.
  *F16J 15/22* (2006.01)
  *F04D 29/10* (2006.01)
  *F01D 11/00* (2006.01)
  *F16J 15/3292* (2016.01)
  *F16J 15/24* (2006.01)

(52) U.S. Cl.
  CPC ......... *F16J 15/3292* (2013.01); *F01D 11/003* (2013.01); *F05D 2240/55* (2013.01); *F05D 2240/57* (2013.01); *F05D 2240/59* (2013.01); *F16J 15/24* (2013.01)

(58) Field of Classification Search
  CPC .... F16J 15/328; F16J 15/3284; F16J 15/3288; F16J 15/3292
  See application file for complete search history.

(56) References Cited

U.S. PATENT DOCUMENTS

| | | |
|---|---|---|
| 2012/0007318 A1 | 1/2012 | Lee et al. |
| 2013/0119612 A1 | 5/2013 | Jahn |
| 2013/0181412 A1 | 7/2013 | Shinohara et al. |
| 2014/0070496 A1 | 3/2014 | Jahn et al. |

OTHER PUBLICATIONS

International Search Report dated Feb. 16, 2016 in International (PCT) Application No. PCT/JP2015/085001, with English Translation.

International Preliminary Report on Patentability and Written Opinion dated Jun. 20, 2017 in International (PCT) Application No. PCT/JP2015/085001, with English Translation.

\* cited by examiner

SHAFT SEALING MECHANISM

TECHNICAL FIELD

The present invention relates to a shaft sealing mechanism disposed around a rotating shaft of a steam turbine or a gas turbine for reducing the amount of leakage of fluid leaked from a high-pressure side to a low-pressure side.

BACKGROUND ART

Conventionally, a shaft sealing mechanism for reducing the amount of leakage of fluid leaked from a high-pressure side to a low-pressure side is disposed around a rotating shaft of a steam turbine or a gas turbine, in order to reduce a loss of driving force. Such a shaft sealing mechanism has an annular seal structure in which multiple layers of thin-plate seal pieces in flat plate shapes with their width dimensions being in the rotating shaft direction are arranged in the circumferential direction of the rotating shaft. Outer-circumferential-side proximal ends of the thin-plate seal pieces are fixed to an annular seal housing while inner-circumferential-side distal ends the thin-plate seal pieces are in sliding contact with the outer circumferential surface of the rotating shaft at a predetermined preload. This enables the shaft sealing mechanism to partition the surrounding space of the rotating shaft into a high-pressure-side region and a low-pressure-side region with the boundary formed by a large number of the thin-plate seal pieces arranged annularly on the outer side in the radial direction of the rotating shaft.

Hence, while the rotating shaft is not rotating, the inner-circumferential-side distal ends of the thin-plate seal pieces are in contact with the outer circumferential surface of the rotating shaft at the predetermined preload. On the other hand, while the rotating shaft is rotating, the thin-plate seal pieces are warped by pressure difference due to relative positional difference in pressure distribution between the upper and lower surfaces of the thin-plate seal pieces and by dynamic pressure effect of the fluid generated by the rotation of the rotating shaft, and accordingly, the inner-circumferential-side distal ends of the thin-plate seal pieces are floated up from the outer circumferential surface of the rotating shaft and brought into a noncontact state. This prevents abrasion and heat generation of the thin-plate seal pieces and the rotating shaft. Note that the surfaces of the thin-plate seal pieces facing the rotating shaft are referred to as the lower surfaces, and the surfaces thereof opposite from the lower surfaces are referred to as the upper surfaces.

Such a conventional shaft sealing mechanism has been disclosed, for example, in Patent Document 1.

PRIOR ART DOCUMENT

Patent Document

Patent Document 1: United States Patent Application Publication No. 20120007318

SUMMARY OF THE INVENTION

Problems to be Solved by the Invention

In this structure, when the rotating shaft rotates, the fluid passes through between the thin-plate seal pieces and the pressure of the fluid is exerted on each thin-plate seal piece. However, depending on the amount of variation in dimension of thickness among the thin-plate seal pieces, the pressure of the fluid passing through between each adjacent thing-plate seal pieces is non-uniform, which causes the difference between the pressures exerted on the upper and the lower surfaces of the thin-plate seal pieces.

When such a difference occurs between the pressures exerted on the upper and the lower surfaces of the thin-plate seal pieces, since the inner-circumferential-side distal end of the thin-plate seal piece is a free end as described above, vibration tends to occur on the distal end sides of the thin-plate seal pieces. In particular, of the distal end side of the thin-plate seal piece, at a portion on the low-pressure side where the fluid passes out between the thin-plate seal pieces toward the low-pressure-side region, the flow of the fluid causes vortex flows, which are likely to cause large vibration, and in some cases, may break thin-plate seal pieces.

Hence, the present invention is to solve the above problems and an object thereof is to provide a shaft sealing mechanism capable of reducing vibration of the thin-plate seal pieces by making the pressure of the fluid flowing between each adjacent thin-plate seal pieces uniform to eliminate the difference between the pressures exerted on the upper and the lower surfaces of the thin-plate seal pieces.

Means for Solving the Problems

A shaft sealing mechanism to solve the above problems according to a first aspect of the invention is a shaft sealing mechanism that, by being disposed in an annular space formed between a fixed part and a rotating shaft, partitions the annular space into a high-pressure-side region and a low-pressure-side region to prevent fluid from flowing from the high-pressure-side region toward the low-pressure-side region in the annular space in a direction of the rotating shaft, characterized in that the shaft sealing mechanism comprises:

an annular seal housing disposed at an inner circumferential portion of the fixed part;

a plurality of thin-plate seal pieces stacked and disposed annularly in a circumferential direction of the rotating shaft, each of which has an outer-circumferential-side proximal end fixed to the seal housing, an inner-circumferential-side distal end being a free end and forming an acute angle with an outer circumferential surface of the rotating shaft, and a width dimension in the direction of the rotating shaft; and an annular low-pressure-side plate held between the seal housing and low-pressure-side side edges of the thin-plate seal pieces facing the low-pressure-side region so as to form a gap between the low-pressure-side side edges and the seal housing in the direction of the rotating shaft, wherein each of the thin-plate seal pieces has one or more pressure conduction holes which are formed on an inner side of an inner-circumferential-side distal end of the low-pressure-side plate in a radial direction of the rotating shaft and allow the fluid flowing on an upper surface side of the thin-plate seal piece and the fluid flowing on a lower surface side of the thin-plate seal piece to pass therethrough.

A shaft sealing mechanism to solve the above problems according to a second aspect of the invention is characterized in that the pressure conduction holes are formed alongside the inner-circumferential-side distal end of the thin-plate seal piece.

A shaft sealing mechanism to solve the above problems according to a third aspect of the invention is characterized in that the pressure conduction holes are formed alongside the low-pressure-side side edge.

A shaft sealing mechanism to solve the above problems according to a fourth aspect of the invention is characterized in that hole positions of the pressure conduction holes formed in the thin-plate seal pieces adjacent in the circumferential direction of the rotating shaft are shifted from each other.

A shaft sealing mechanism to solve the above problems according to a fifth aspect of the invention is characterized in that thin-plate seal pieces having no pressure conduction hole are arranged intermittently in the circumferential direction of the rotating shaft.

Effect of the Invention

Hence, since the shaft sealing mechanism of the present invention is capable of eliminating the difference between the pressures of the fluid exerted on the upper and the lower surfaces of the thin-plate seal pieces by forming a pressure conduction hole only on the distal end side of the thin-plate seal piece, which is an area where vibration occurs, to make the pressure of the fluid flowing between each adjacent thin-plate seal pieces uniform, it is possible to reduce the vibration of the thin-plate seal pieces.

MODE FOR CARRYING OUT THE INVENTION

A shaft sealing mechanism according to the present invention will be described in detail using the drawings.

Embodiment

Figure 1:
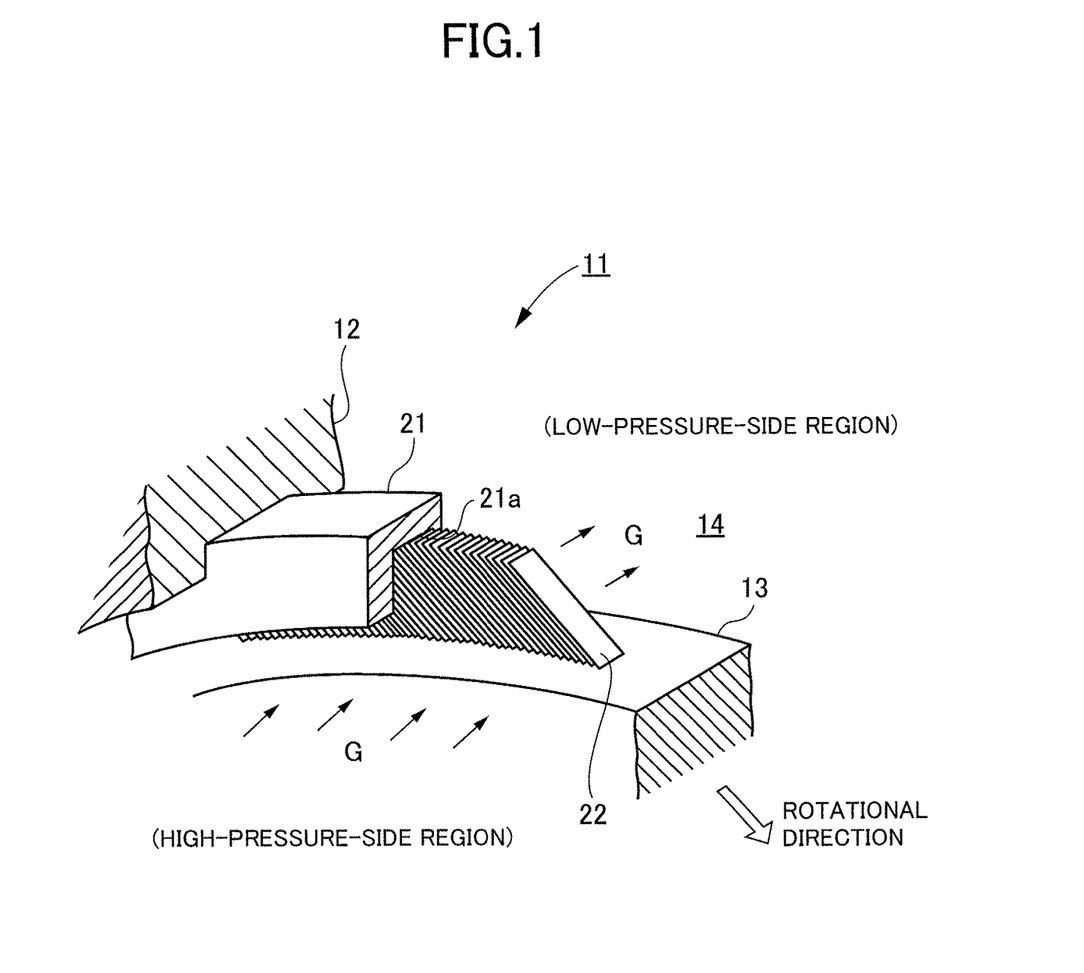
FIG. 1 is a schematic configuration diagram of a shaft sealing mechanism according to the present invention.

As illustrated in FIG. 1, a shaft sealing mechanism 11 according to the present invention is applied to, for example, a steam turbine or a gas turbine and is disposed in an annular space 14 formed between a rotating shaft 13 and a fixed part (stationary part) 12 such as a casing or stator vanes.

Figure 2:
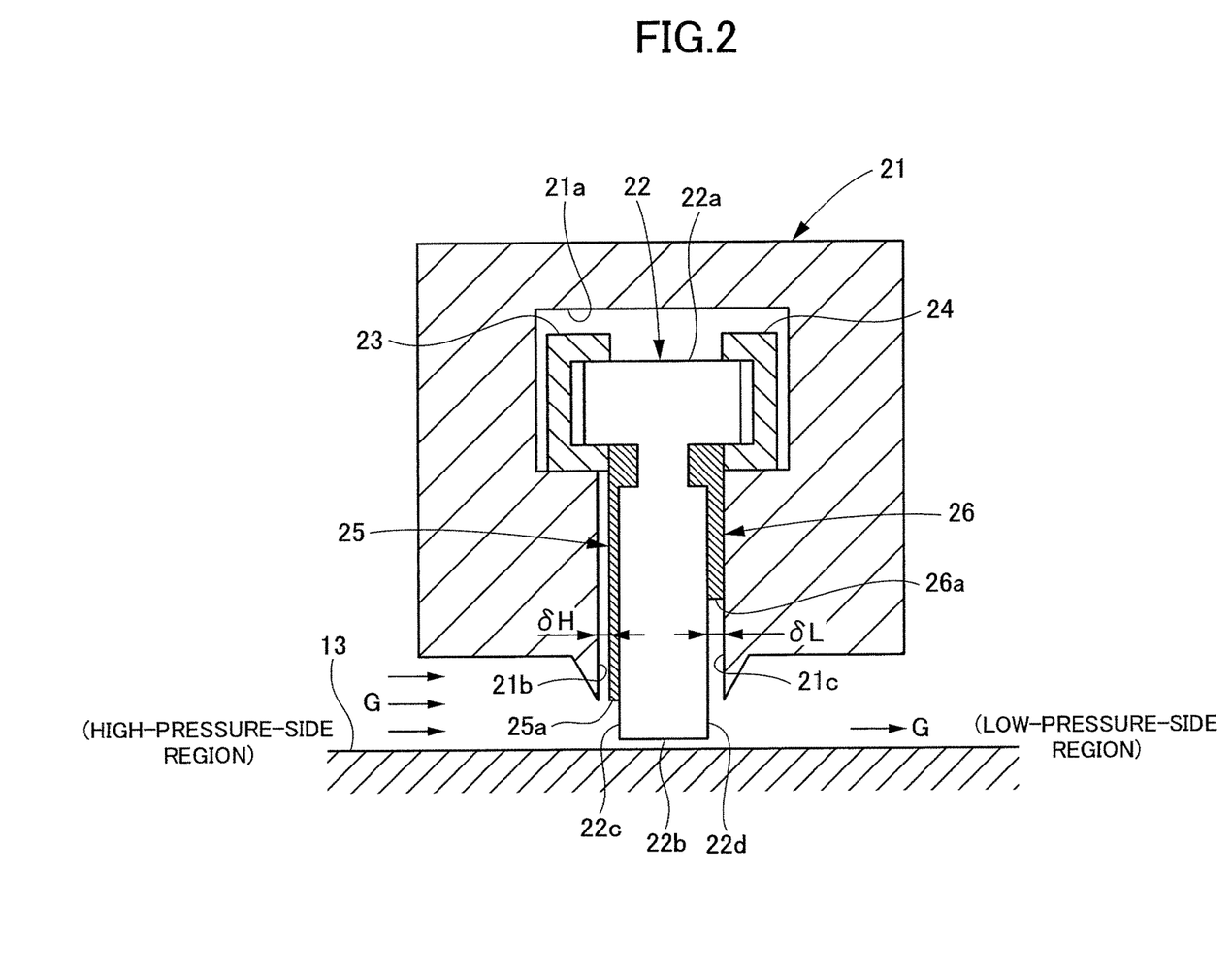
FIG. 2 is an axial cross-sectional view of the shaft sealing mechanism according to the present invention.

Specifically, as illustrated in FIGS. 1 and 2, on an inner circumferential portion of the fixed part 12, a seal housing 21, which is an outer shell of the shaft sealing mechanism 11, is disposed annularly alongside the circumferential direction of the rotating shaft 13. In addition, formed in an inner circumferential portion of the seal housing 21 is an annular groove 21a, inside of which a large number of thin-plate seal pieces 22 are arranged alongside the circumferential direction of the rotating shaft 13.

The outer-circumferential-side proximal ends 22a of the thin-plate seal pieces 22 are fixed to the inside of the annular groove 21a while the inner-circumferential-side distal ends 22b of the thin-plate seal pieces 22 are in sliding contact with the outer circumferential surface of the rotating shaft 13 at a predetermined preload. Here, the thin-plate seal pieces 22 are arranged such that the inner-circumferential-side distal ends 22b, which are free ends, have inclination in the rotational direction with respect to the outer circumferential surface of the rotating shaft 13 and form acute angles with the outer circumferential surface. Note that the lower surfaces of the thin-plate seal pieces 22 supported in an inclined manner refer to the surfaces facing the rotating shaft 13, and the upper surfaces thereof refer to the surfaces opposite from the lower surfaces.

In the annular space 14 formed between the fixed part 12 and the rotating shaft 13, fluid G, such as steam or combustion gas, flows from a high-pressure side to a low-pressure side in the axial direction of the rotating shaft 13. For this, the shaft sealing mechanism 11 has an annular seal structure in which multiple layers of the thin-plate seal pieces 22 are arranged in the circumferential direction of the rotating shaft 13, and in which the boundary formed by a large number of the thin-plate seal pieces 22 arranged annularly partitions the annular space 14 into a high-pressure-side region being an upstream side in the fluid flowing direction and a low-pressure-side region being an downstream side in the fluid flowing direction. This structure reduces the amount of leakage of the fluid G leaked from the high-pressure-side region to the low-pressure-side region.

Figure 3:
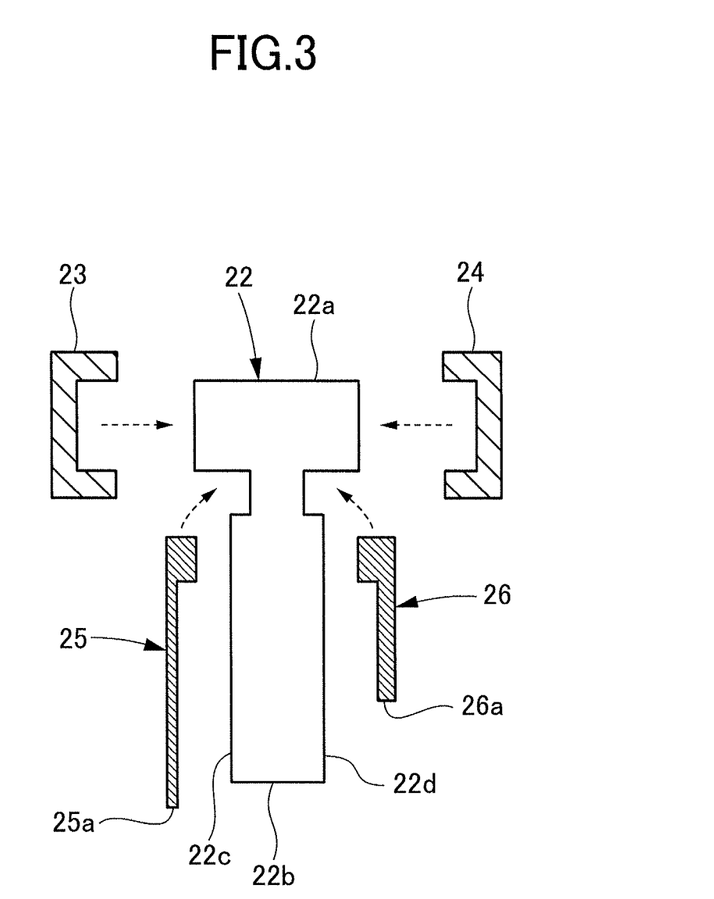
FIG. 3 is an exploded view of a support structure of a thin-plate seal piece.

Here, as illustrated in FIGS. 2 and 3, each of the thin-plate seal pieces 22 is formed from a flexible material having flexibility and has a flat plate shape with its width dimension being in the axial direction of the rotating shaft 13. Specifically, the thin-plate seal piece 22 has a T shape in which the plate width on the proximal end side (the outer-circumferential-side proximal end 22a) is wider than the plate width on the distal end side (the inner-circumferential-side distal end 22b) and is thinned so as to exhibit flexibility. The thin-plate seal pieces 22 are arranged annularly with minute gaps of a certain length therebetween in the circumferential direction of the rotating shaft 13.

The proximal end sides of the thin-plate seal pieces 22 are held between a pair of right and left retainers 23, 24 for keeping the annular arrangement of the thin-plate seal pieces 22, so as to be enclosed from both sides in the plate width direction. The retainers 23, 24 are fitted into the annular groove 21a of the seal housing 21.

In addition, on the high-pressure side and the low-pressure side of the thin-plate seal pieces 22, a high-pressure-side plate 25 and a low-pressure-side plate 26 are disposed respectively to function as guide plates for the fluid G.

Specifically, the high-pressure-side plate 25 having an annular shape is disposed on the left sides (the side positioned on the left in FIGS. 2 and 3 on the paper) of the thin-plate seal pieces 22, which face the high-pressure-side region. This high-pressure-side plate 25 is disposed adjacent to high-pressure-side side edges 22c of the thin-plate seal pieces 22 facing the high-pressure-side region and is held between the high-pressure-side side edges 22c and the retainer 23.

Here, an inner-circumferential-side distal end 25a of the high-pressure-side plate 25 extends to an opening edge of the annular groove 21a, but does not reach the inner-circumferential-side distal end 22b of the thin-plate seal pieces 22. Moreover, between a high-pressure-side side surface 21b, facing the high-pressure-side region, of the annular groove 21a and the high-pressure-side plate 25, a high-pressure-side gap 6H of a certain length is formed in the axial direction of the rotating shaft 13 (the fluid flowing direction, the plate width direction of the seal pieces).

By providing the high-pressure-side plate 25 in this way, the inner-circumferential-side distal ends 22b of the thin-plate seal pieces 22 are positioned on the inner side of the inner-circumferential-side distal end 25a of the high-pressure-side plate 25 in the radial direction of the rotating shaft 13. Accordingly, the fluid G flowing in from the high-pressure-side region flows into the distal end sides of the thin-plate seal pieces 22.

Meanwhile, the low-pressure-side plate 26 in an annular shape is disposed on the right sides (the side positioned on the right in FIGS. 2 and 3 on the paper) of the thin-plate seal pieces 22, which face the low-pressure-side region. This low-pressure-side plate 26 is disposed adjacent to low-pressure-side side edges 22d, facing the low-pressure-side region, of the thin-plate seal pieces 22 and is held among the low-pressure-side side edges 22d, the retainer 24, and a low-pressure-side side surface 21c, facing the low-pressure-side region, of the annular groove 21a.

Here, an inner-circumferential-side distal end 26a of the low-pressure-side plate 26 does not reach an opening edge of the annular groove 21a or the inner-circumferential-side distal ends 22b of the thin-plate seal pieces 22 and is positioned on the outer side of the inner-circumferential-side distal end 25a of the high-pressure-side plate 25 in the radial direction of the rotating shaft 13. In other words, the low-pressure-side plate 26 is shorter than the high-pressure-side plate 25. Moreover, between the low-pressure-side side surface 21c of the annular groove 21a and the low-pressure-side side edges 22d, a low-pressure-side gap δL of a certain length is formed in the axial direction of the rotating shaft 13.

The low-pressure-side plate 26 provided in this way allows the low-pressure-side gap δL to be formed between the low-pressure-side side surface 21c and the low-pressure-side side edges 22d. The low-pressure-side gap δL is formed by the thickness of the low-pressure-side plate 26, and the gap length of the low-pressure-side gap δL can thus be set by adjusting the thickness of the low-pressure-side plate 26.

In addition, the pressure distribution of the fluid G on the upper and lower surfaces of the thin-plate seal pieces 22 can be set in accordance with the gap lengths of the high-pressure-side gap δH and the low-pressure-side gap δL. Moreover, in accordance with the quantitative relationship between the gap length of the high-pressure-side gap δH and the gap length of the low-pressure-side gap δL, it is possible to set the magnitude of the pressure difference (floating force) due to relative positional difference in the pressure distribution between the upper and lower surfaces of the thin-plate seal pieces 22.

Note that in the shaft sealing mechanism 11 according to the present invention, the radial gap length between the inner-circumferential-side distal end 26a of the low-pressure-side plate 26 and the outer circumferential surface of the rotating shaft 13 is designed to be greater than the radial gap length between the inner-circumferential-side distal end 25a of the high-pressure-side plate 25 and the outer circumferential surface of the rotating shaft 13, in order to yield stable floating force.

With this structure, while the rotating shaft 13 is not rotating, the inner-circumferential-side distal ends 22b of the thin-plate seal pieces 22 are in contact with the outer circumferential surface of the rotating shaft 13 at the predetermined preload. On the other hand, while the rotating shaft 13 is rotating, the floating force is exerted on the thin-plate seal pieces 22 by the pressure difference due to the relative positional difference in the pressure distribution between the upper and lower surfaces of the thin-plate seal pieces 22 and by the dynamic pressure effect of the fluid G generated by the rotation of the rotating shaft 13. This makes the thin-plate seal pieces 22 warped, and accordingly, the inner-circumferential-side distal ends 22b thereof are floated from the outer circumferential surface of the rotating shaft 13 and brought into a noncontact state, which prevents abrasion and heat generation of the rotating shaft 13 and the thin-plate seal pieces 22. At the same time, the thin-plate seal pieces 22 brought in noncontact with the rotating shaft 13 reduce the amount of leakage of the fluid G flowing from the high-pressure-side region toward the low-pressure-side region.

Figure 4:
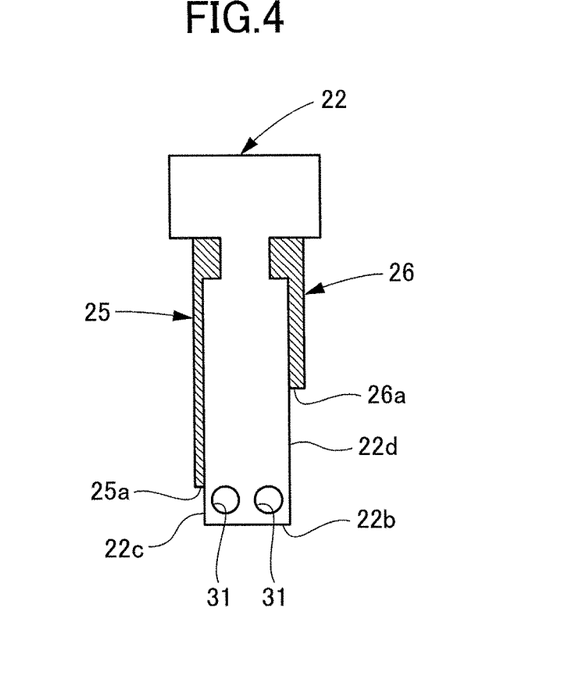
FIG. 4 is a front view of a thin-plate seal piece in a shaft sealing mechanism according to a first embodiment.

Here, as illustrated in FIG. 4, multiple pressure conduction holes 31 are formed in the thin-plate seal piece 22. These pressure conduction holes 31 are through holes passing through the upper surface and the lower surface in the thin-plate seal piece 22, and are arranged on an inner side of the inner-circumferential-side distal end 26a of the low-pressure-side plate 26 in the radial direction of the rotating shaft 13 and alongside the inner-circumferential-side distal end 22b in the axial direction of the rotating shaft 13. Opening the pressure conduction holes 31 as described above in the thin-plate seal piece 22 allows the fluid G flowing on the upper surface side and the fluid G flowing on the lower surface side to come and go through the pressure conduction holes 31. In other words, the fluid G having the higher pressure, when comparing the pressure of the fluid G flowing alongside the upper surface and the pressure of the fluid G flowing alongside the lower surface, passes through the pressure conduction holes 31 and flows into the side where the pressure of the fluid G is lower. The both pressures eventually become equal to each other. Thus, the pressure of the fluid G flowing between each adjacent thin-plate seal pieces 22 (each minute gap) becomes uniform.

As described above, by forming the pressure conduction holes 31 passing through the thin-plate seal piece 22 in the thickness direction, it is possible to make the pressure of the fluid G flowing between each adjacent thin-plate seal pieces 22 uniform. Since this eliminates the difference between the pressures of the fluid exerted on the upper and the lower surfaces of the thin-plate seal pieces 22, it is possible to reduce the vibration of the thin-plate seal pieces 22. In this case, since the pressure conduction holes 31 are formed only on the distal end side of the thin-plate seal piece 22, which is an area where vibration occurs, it is possible to obtain proper pressure distributions on the portions on the upper surface and the lower surface on the outer side of the pressure conduction holes 31 in the radial direction of the rotating shaft 13, which allows the thin-plate seal piece 22 to float stably as a whole.

Figure 5:
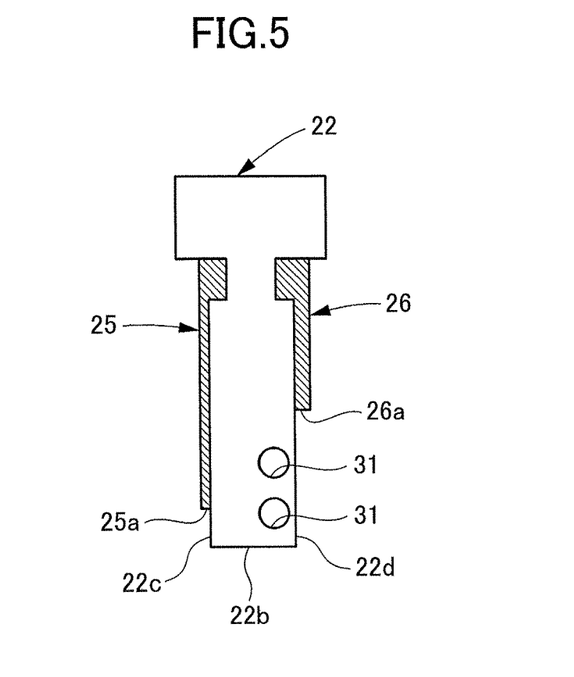
FIG. 5 is a front view of a thin-plate seal piece in a shaft sealing mechanism according to a second embodiment.

Alternatively, the pressure conduction holes 31 may be formed as illustrated in FIG. 5 in the thin-plate seal piece 22. These pressure conduction holes 31 are arranged on the inner side of the inner-circumferential-side distal end 26a of the low-pressure-side plate 26 in the radial direction of the rotating shaft 13 and alongside the low-pressure-side side edge 22d in the radial direction of the rotating shaft 13. By forming the pressure conduction holes 31 concentratedly only on the low-pressure side, where the vibration is strongest in the thin-plate seal piece 22, as described above, it is possible to reduce the vibration of the thin-plate seal piece 22 efficiently.

Note that when forming the pressure conduction holes 31 in the thin-plate seal piece 22, the hole positions of the pressure conduction holes 31 formed in adjacent thin-plate pieces 22 are shifted from each other. If the positions of the pressure conduction holes 31 are the same between the adjacent thin-plate seal pieces 22, the pressure conduction holes 21 having the same position form an annular pressure conduction path alongside the circumferential direction of the rotating shaft 13. In some cases, the fluid G may flow swiftly in the annular pressure conduction path. As a result, there is a risk that the pressure of the fluid G flowing through each adjacent thin-plate seal pieces 22 cannot be made uniform.

Figure 6:
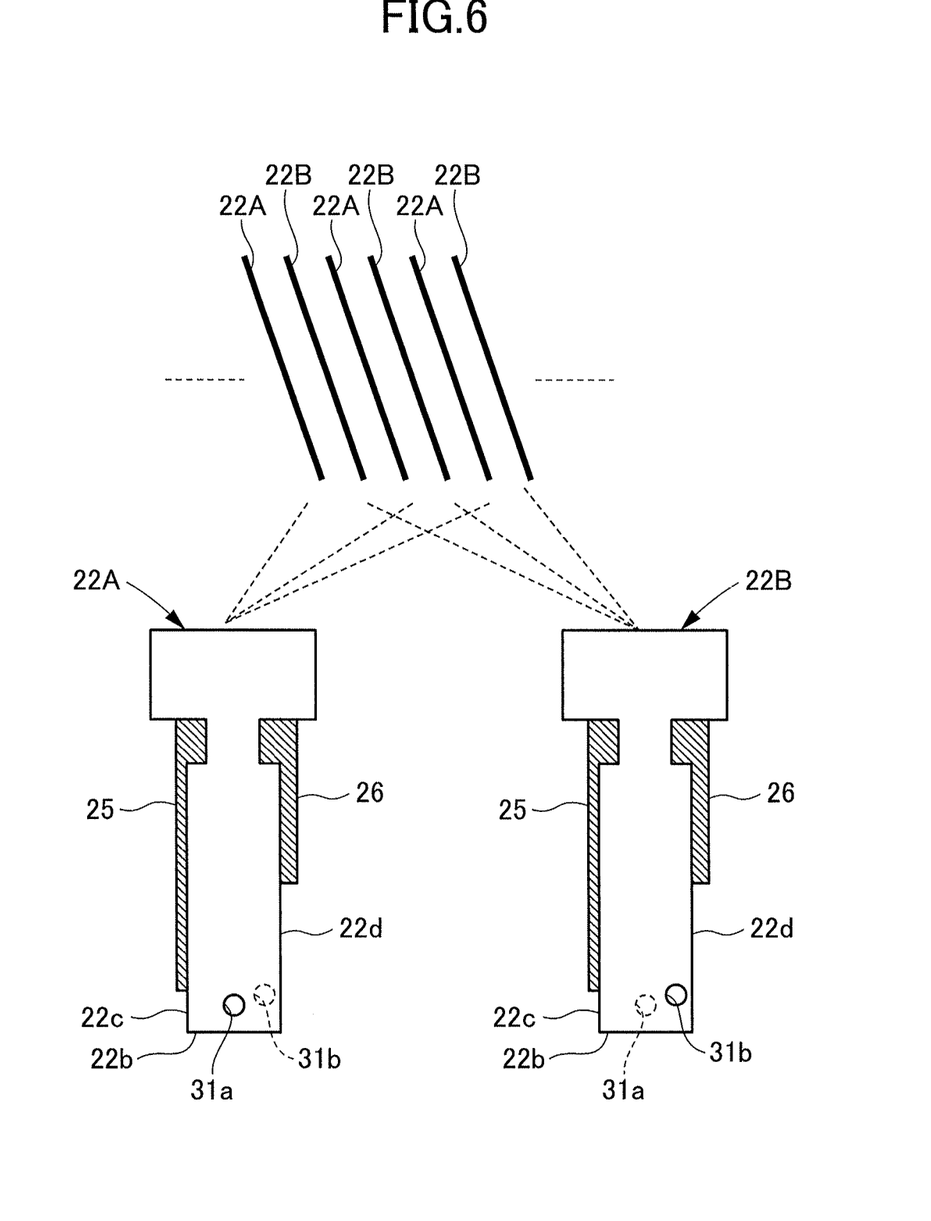
FIG. 6 is a diagram illustrating an example of an arrangement form of the thin-plate seal pieces.

Specifically, as illustrated in FIG. 6, in the shaft sealing mechanism 11, thin-plate seal pieces 22A having a pressure conduction hole 31a and thin-plate seal pieces 22B having a pressure conduction hole 31b are arranged and these thin-plate seal pieces 22A and 22B are disposed alternately. In this case, the pressure conduction hole 31a is arranged around the center at the inner-circumferential-side distal end 22b. On the other hand, the pressure conduction hole 31b is arranged on the low-pressure side of the inner-circumferential-side distal end 22b, and on the outer side of the pressure conduction hole 31a in the radial direction of the rotating shaft 13. In other words, the hole position of the pressure conduction hole 31a and the hole position of the pressure conduction hole 31b are shifted from each other in the axial direction and the circumferential direction of the rotating shaft 13 to prevent the hole openings from overlapping. In addition, when shifting the hole positions, although the shift amount depends on the shapes and sizes of the pressure conduction holes 31a and 31b, it is preferable that the hole positions be shifted from each other by half or more the size of the pressure conduction holes 31a and 31b.

If the hole positions of the pressure conduction holes 31 are the same among all the thin-plate seal pieces 22, the same effect can be obtained, for example, by providing thin-plate seal pieces 22 having no pressure conduction hole 31 intermittently, each at every other position, or at every third or larger number position, in the multiple thin-plate seal pieces 22 arranged annularly.

Figure 7:
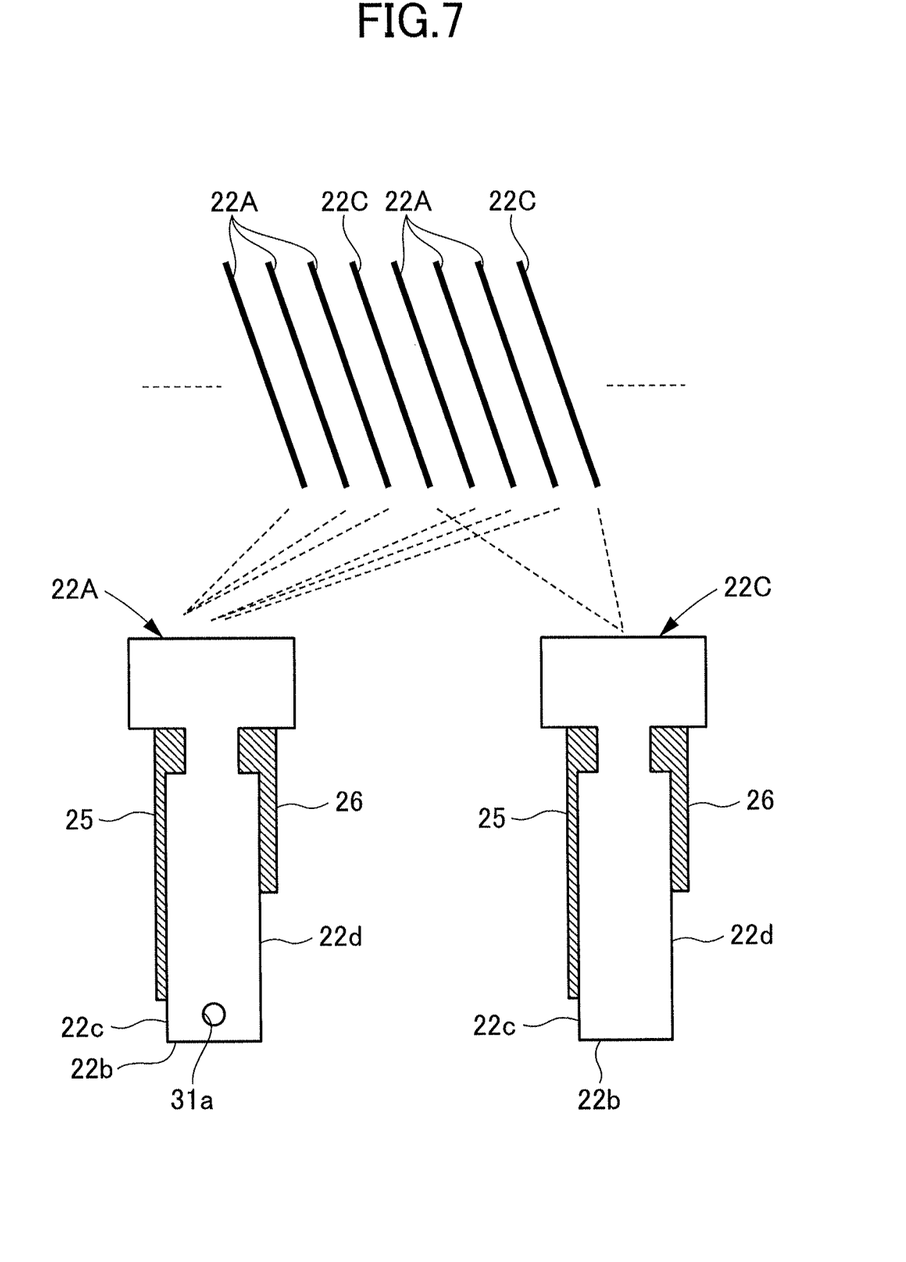
FIG. 7 is a diagram illustrating another example of an arrangement form of the thin-plate seal pieces.

Specifically, as illustrated in FIG. 7, arranged in the shaft sealing mechanism 11 are thin-plate seal pieces 22A having the pressure conduction hole 31a and thin-plate seal pieces 22C having no pressure conduction hole. The thin-plate seal pieces 22C are arranged, each at every fourth position in the thin-plate seal pieces 22A. In this structure, the hole positions of the pressure conduction holes 31a are the same in the three thin-plate seal pieces 22A consecutively arranged in the circumferential direction of the rotating shaft 13, and an annular pressure conduction path is formed, but it is short as an annular pressure conduction path. Hence, even though the fluid G flows in the annular pressure conduction path, the flow hardly affects the action of making uniform the pressure of the fluid G flowing between each adjacent thin-plate seal pieces 22A.

Moreover, by adjusting the number, the inner diameters, the hole positions, the hole shapes, and the like of the pressure conduction holes 31 when forming them in the thin-plate seal piece 22, it is possible to reduce the vibration of the thin-plate seal piece 22 efficiently while giving a stable floating force to the thin-plate seal piece 22.

INDUSTRIAL APPLICABILITY

The shaft sealing mechanism according to the present invention can increase the life of the seal by controlling the flow direction of the fluid between the thin-plate seal pieces, and can thus be utilized significantly advantageously in continuous operation of a turbine.

EXPLANATION OF REFERENCE NUMERALS 11 shaft sealing mechanism
12 fixed part
13 rotating shaft
14 annular space
21 seal housing
21a annular groove
21b high-pressure-side side surface
21c low-pressure-side side surface
22, 22A to 22C thin-plate seal piece
22a outer-circumferential-side proximal end
22b inner-circumferential-side proximal end
22c high-pressure-side side edge
22d low-pressure-side side edge
23, 24 retainer
25 high-pressure-side plate
25a inner-circumferential-side distal end
26 low-pressure-side plate
26a inner-circumferential-side distal end
31, 31a, 31b pressure conduction hole
G fluid
δH high-pressure-side gap
δL low-pressure-side gap

The invention claimed is:

1. A shaft sealing mechanism that, by being disposed in an annular space formed between a fixed part and a rotating shaft, partitions the annular space into a high-pressure-side region and a low-pressure-side region to prevent fluid from flowing from the high-pressure-side region toward the low-pressure-side region in the annular space in a direction of the rotating shaft, characterized in that the shaft sealing mechanism comprises:
   an annular seal housing disposed at an inner circumferential portion of the fixed part;
   a plurality of thin-plate seal pieces stacked and disposed annularly in a circumferential direction of the rotating shaft, each of which has an outer-circumferential-side proximal end fixed to the seal housing, an inner-circumferential-side distal end being a free end and forming an acute angle with an outer circumferential surface of the rotating shaft, and a width dimension in the direction of the rotating shaft; and
   an annular low-pressure-side plate held between the seal housing and low-pressure-side side edges of the thin-plate seal pieces facing the low-pressure-side region so as to form a gap between the low-pressure-side side edges and the seal housing in the direction of the rotating shaft, wherein
   each of the thin-plate seal pieces has a pressure conduction hole which is formed on an inner side of an inner-circumferential-side distal end of the low-pressure-side plate in a radial direction of the rotating shaft and alongside the low-pressure-side side edge, and allows the fluid flowing on an upper surface side of the thin-plate seal piece and the fluid flowing on a lower surface side of the thin-plate seal piece to pass therethrough.

2. The shaft sealing mechanism according to claim 1, characterized in that
   the pressure conduction hole is formed alongside the inner-circumferential-side distal end of the thin-plate seal piece.

3. The shaft sealing mechanism according to claim 1, characterized in that
  hole positions of the pressure conduction holes formed in the thin-plate seal pieces adjacent in the circumferential direction of the rotating shaft are shifted from each other.

4. The shaft sealing mechanism according to claim 1, characterized in that
  thin-plate seal pieces having no pressure conduction hole are arranged intermittently in the circumferential direction of the rotating shaft.

\* \* \* \* \*